United States Patent [19]

Downing et al.

[11] Patent Number: 5,188,911
[45] Date of Patent: Feb. 23, 1993

[54] TAPERED MANIFOLD FOR BATTERIES REQUIRING FORCED ELECTROLYTE FLOW

[75] Inventors: Robert W. Downing; Donald V. Conte, both of Fort Wayne, Ind.

[73] Assignee: Magnavox Electronic Systems Company, Fort Wayne, Ind.

[21] Appl. No.: 659,647

[22] Filed: Feb. 25, 1991

[51] Int. Cl.$^5$ .................. H01M 2/40; H01M 6/34
[52] U.S. Cl. ........................... 429/70; 429/80; 429/119
[58] Field of Search .............. 429/70, 80, 81, 118, 429/119

[56] References Cited

U.S. PATENT DOCUMENTS

| | | | |
|---|---|---|---|
| 916,320 | 3/1909 | Joel | 429/81 |
| 3,388,003 | 6/1968 | Jackley | 429/81 |
| 4,072,801 | 2/1978 | Burant et al. | 429/119 X |
| 4,735,871 | 4/1988 | Descroix et al. | 429/81 X |

Primary Examiner—Stephen Kalafut
Attorney, Agent, or Firm—Roger M. Rickert; Richard T. Seeger

[57] ABSTRACT

In a preferred embodiment, inlet and outlet manifolds for a forced electrolyte flow battery, the manifolds having nonuniform cross-sections. The inlet manifold extends along the base of the battery cells and tapers from a large cross-section at the inlet end thereof to a small cross-section at the closed opposite end of the manifold. The outlet manifold has electrolyte outlets at either end of the manifold and tapers from a small cross-section at the middle of the manifold to large cross-sections at the electrolyte outlets of the manifolds. The inlet and outlets to and from the inlet and outlet manifolds are arranged, respectively, such that the header connected to the inlet manifold is larger in cross-section than the cross-section of the inlet manifold at that point and the headers connected to the outlet manifold are larger in cross-section than the cross-sections of the outlet manifold at that point.

5 Claims, 3 Drawing Sheets

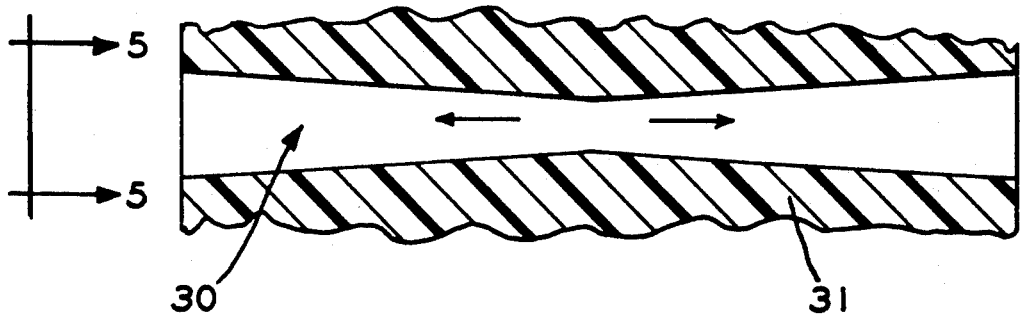
FIG_3
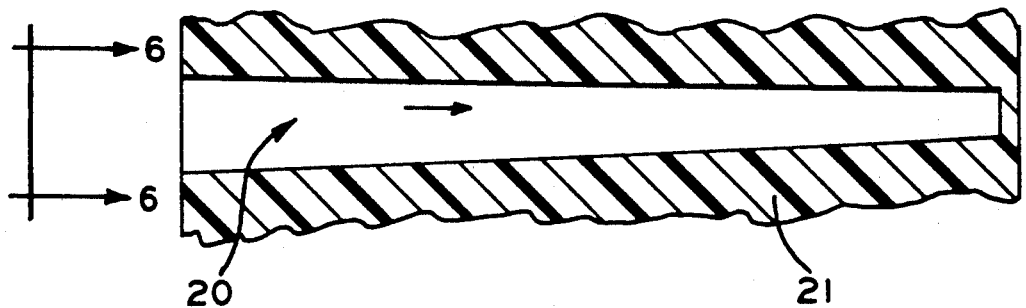
FIG_4
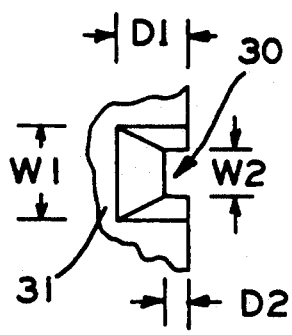
FIG_5
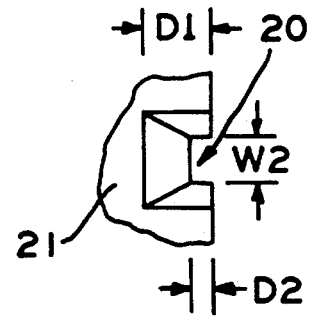
FIG_6

TAPERED MANIFOLD FOR BATTERIES REQUIRING FORCED ELECTROLYTE FLOW

BACKGROUND OF THE INVENTION

1. Field of the Invention

The present invention relates generally to batteries requiring forced flow of electrolyte and, more particularly, to a novel manifold design for the inlet and outlet of such a battery which results in more uniform distribution of the flow of electrolyte through the battery, thus providing longer battery life.

2. Background Art

Forced electrolyte flow batteries are employed, for example, to provide power to electrical equipment in underwater environments, in which batteries the electrolyte is seawater pumped between the plates of the batteries.

One battery for use in such applications is the magnesium/silver chloride battery. The battery consists of a number of cell plates closely stacked in parallel with electrolyte entering via an inlet manifold, flowing past the plates through the inter-plate spaces, and exiting via an outlet manifold. In such a battery, it is critical that the corrosion products generated by the electrochemical reaction be removed from the narrow inter-cell spaces. If this is not done, clogging will result and the battery no longer will be able to deliver power, resulting in a shortened battery life. To ensure that such corrosion products are removed, the seawater electrolyte is forced past the plates from bottom to top in order to complement the natural upward flow of the hydrogen gas which is produced along with the aforementioned corrosion products as a by-product of the electrochemical reaction.

It has been found that simply providing inlet and outlet electrolyte manifolds of constant cross-section has the disadvantage that, with such manifolds, some of the battery cells receive very little flow and some even experience reverse flow (top to bottom). As a consequence, cells experiencing poor electrolyte flow develop clogging and, as a result of such clogging, expected battery life is not achieved. Furthermore, it is found that there is turbulence in various sections of the flow path and this turbulence contributes to the nonuniform distribution of electrolyte flow.

Accordingly, it is a principal object of the present invention to provide means to improve the distribution of electrolyte flow in forced electrolyte flow batteries.

It is a further object of the invention to provide such means that can be easily and economically constructed.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, inlet and outlet manifolds for a forced electrolyte flow battery, the manifolds having nonuniform cross-sections. The inlet manifold extends along the base of the battery cells and tapers from a large cross-section at the inlet end thereof to a small cross-section at the closed opposite end of the manifold. The outlet manifold has electrolyte outlets at either end of the manifold and tapers from a small cross-section at the middle of the manifold to large cross-sections at the electrolyte outlets of the manifolds. The inlet and outlets to and from the inlet and outlet manifolds are arranged, respectively, such that the header connected to the inlet manifold is larger in cross-section than the cross-section of the inlet manifold at that point and the headers connected to the outlet manifold are larger in cross-section than the cross-sections of the outlet manifold at that point.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, in which:

FIG. 3 is bottom plan view looking up, in cross-section, taken along the line "3—3" of FIG. 2, illustrating the end-to-end tapering of the outlet manifold of the battery.

FIG. 4 is a top plan view, in cross-section, taken along the line "4—4" of FIG. 2, illustrating the end-to-end tapering of the inlet manifold of the battery.

FIG. 5 is a side elevational view taken along the line "5—5" of FIG. 3, illustrating the configuration of the outlet manifold as viewed from one outlet end thereof.

FIG. 6 is a side elevational view taken along the line "6—6" of FIG. 4, illustrating the configuration of the inlet manifold as viewed from the inlet end thereof.

DETAILED DESCRIPTION OF THE PREFERRED EMBODIMENTS

Figure 1:
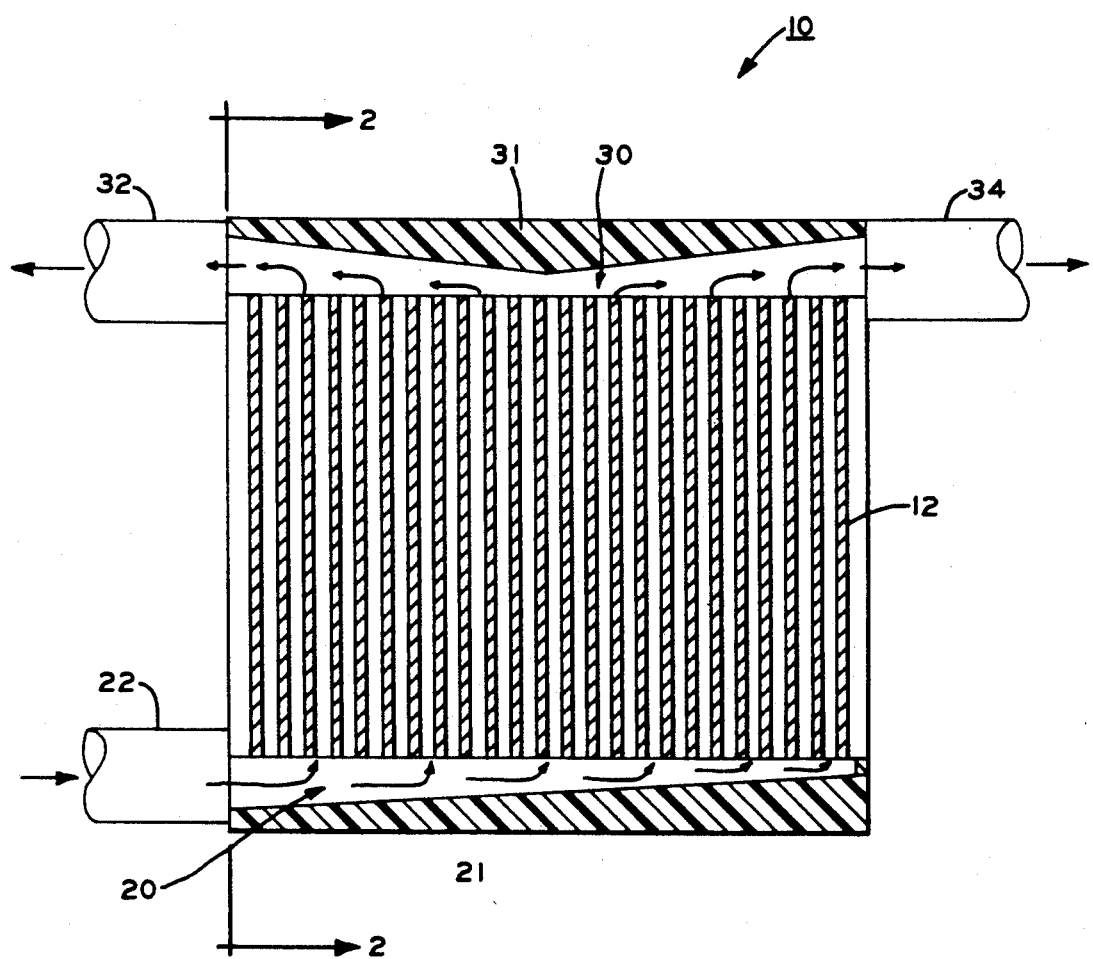
FIG. 1 is a side elevational view, partially in cross-section of a forced electrolyte battery according to the present invention.
Figure 2:
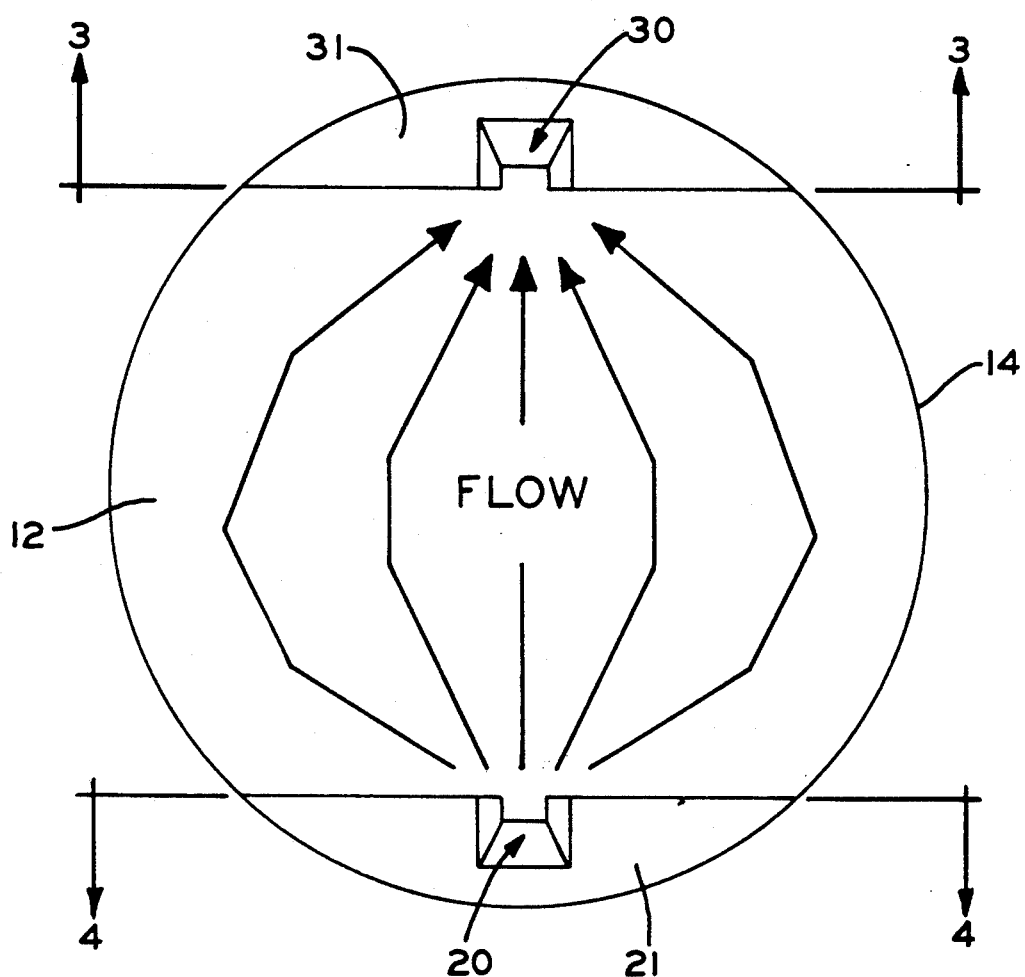
FIG. 2 is an end elevational view taken along the line "2—2" of FIG. 1, illustrating the flow paths of electrolyte through the battery.

Referring now to the Drawing, in which similar or identical elements are given consistent identifying numerals throughout the various figures thereof, FIG. 1 illustrates a forced electrolyte flow battery, generally indicated by the reference numeral 10, which includes a stack of a plurality of vertical, closely spaced apart plates, as at 12, or stack, disposed within a cylindrical shell 14.

Disposed at the lower edges of plates 12 is an elongate inlet manifold 20 comprising a channel extending orthogonally therealong and formed in a lower manifold block 21. Electrolyte enters inlet manifold 20 through an inlet header 22 connected to a source of pumped electrolyte (not shown). Disposed at the upper edges of plates 12 is an elongate outlet manifold 30 comprising a channel extending orthogonally therealong and formed in an upper manifold block 31 to carry electrolyte from the plates for discharge through outlet headers 32 and 34. It is important that headers 22, 32, and 34 have the same cross-sections as the manifold connections to which they are attached, or larger cross-sections (as indicated on FIG. 1), in order to minimize turbulence within manifolds 20 and 30. It has been found that such turbulence can hinder or prevent flow past plates 12 where it occurs.

Reference now also to FIGS. 2–6 will aid in understanding the preferred configurations of inlet and outlet manifolds 20 and 30, respectively. Inlet manifold 20 is tapered, with the largest cross-section at the inlet end and with the cross-section of the manifold decreasing uniformly to the closed opposite end. This configuration accommodates a greater volume of fluid at the input end and, due to the decreasing cross-sectional area, tends to force an increase in pressure toward the blocked end, compensating for frictional losses. Outlet manifold 30 has its smallest cross-sectional area at the middle thereof and the manifold tapers therefrom to the two outlet ends, thus accommodating the greater volume of liquid as each intercell space discharges electrolyte into the manifold.

Both inlet and outlet manifolds 20 and 30 are shown as being of rectilinear form; however, such is not required for practising the present invention. The invention contemplates only that the manifolds taper generally proportionally to the varying flow rate of electrolyte along the manifolds.

For manifolds approximately 6.75 inches long in a forced electrolyte/seawater battery 5.7 inches in diameter, having 108 plates spaced 0.02 inch apart, satisfactory results are achieved with dimensions for the parameters indicated on FIGS. 5 and 6 as follows:

| PARAMETER | INLET MANIFOLD | OUTLET MANIFOLD |
|---|---|---|
| W1, in. | 0.75 | 0.75 |
| D1, in. | 0.32 | 0.25 |
| Area, sq. in. | 0.24 | 0.1875 |
| W2, in. | 0.4 | 0.4 |
| D1, in. | 0.15 | 0.15 |
| Area, sq. in. | 0.06 | 0.06 |

Manifold blocks 21 and 31 may be conveniently formed from a suitable polymeric material with manifolds 20 and 30 milled therein.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. In a battery of the type employing a forced flow of electrolyte and having a stack of a plurality of parallel, closed spaced apart cell plates, an inlet manifold comprising:
    (a) an elongate channel having an inlet end and extending along one side of said stack orthogonal to the planes of said plates so as to permit electrolyte entering said inlet end to flow between the spaces between said plates; and
    (b) said channel having a cross-sectional area tapering from a large cross-section at said inlet end to a first small cross-section interior to said battery, and
  an outlet manifold comprising:
    (a) an elongate outlet channel extending along the length of the stack and having a first and second opposed outlet ends, the elongate outlet channel extending along one side of said stack orthogonal to the planes of said plates so as to permit electrolyte flowing from the spaces between said plates to exit said battery via said outlet ends; and
    (b) said channel having a cross-sectional area tapering from large cross-sections at each of said outlet ends to a second small cross-section interior to said battery near the midpoint of said outlet channel.

2. The combination as defined in claim 1, wherein said inlet end is at one end of said battery and said first small cross-section is at the opposite end of said battery.

3. The combination as defined in claim 1, wherein said cell plates are vertically disposed, said channel is at the base of said stack and said outlet channel is at the top of said stack.

4. The combination as defined in claim 1, wherein said inlet end is connected to a header having a cross-section at least as large as the cross-section of said inlet end.

5. The combination as defined in claim 1, wherein said first and second outlet ends are attached to headers having cross-sections at least as large as the cross-section of their responsive outlet ends.

* * * * *